Sept. 21, 1965  R. J. PRESTON ETAL  3,207,407
VELOCITY CONTROL SYSTEM FOR FOLLOWING IRREGULAR PATTERNS
Filed March 26, 1962  2 Sheets-Sheet 1

INVENTORS
VICTOR S. PETERSON
RICHARD J. PRESTON
BY Donald J. Bradley
AGENT

Sept. 21, 1965  R. J. PRESTON ETAL  3,207,407
VELOCITY CONTROL SYSTEM FOR FOLLOWING IRREGULAR PATTERNS
Filed March 26, 1962  2 Sheets-Sheet 2
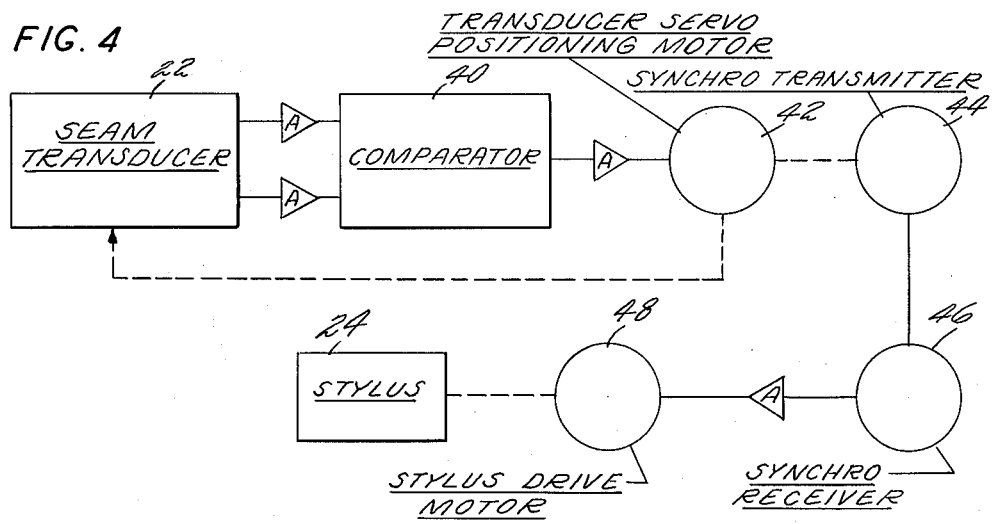
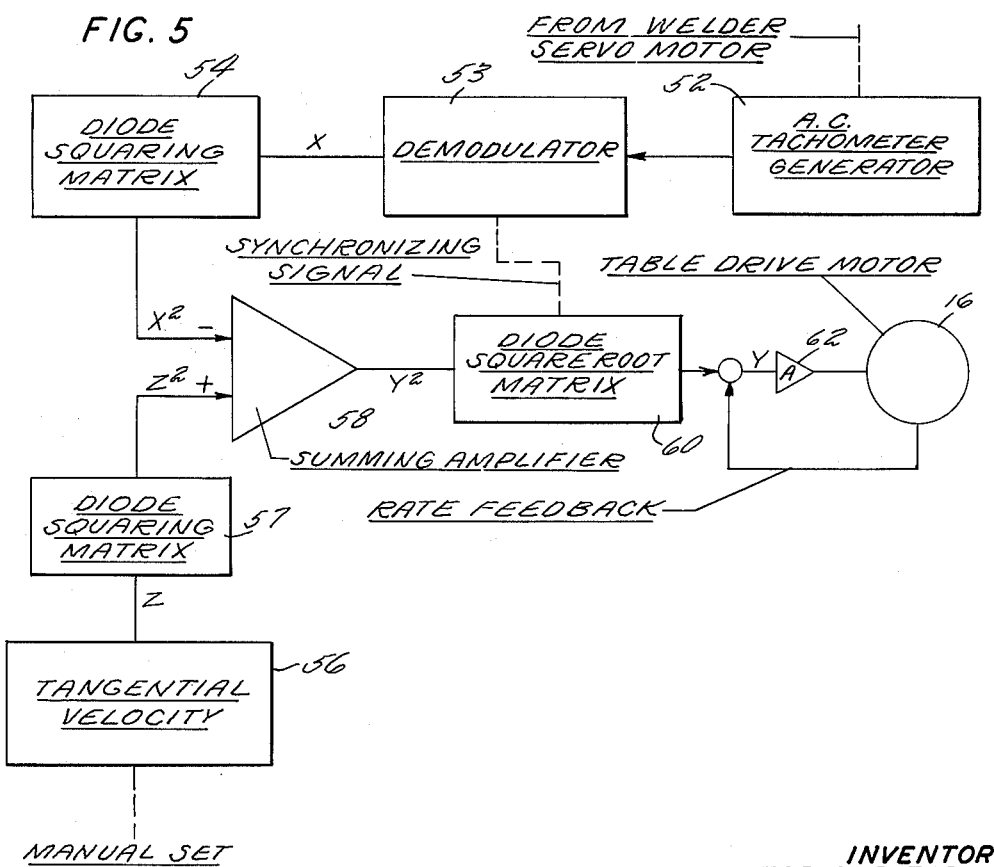
INVENTORS
VICTOR S. PETERSON
RICHARD J. PRESTON
BY Donald J. Bradley
AGENT

United States Patent Office 3,207,407
Patented Sept. 21, 1965

3,207,407
VELOCITY CONTROL SYSTEM FOR FOLLOWING IRREGULAR PATTERNS
Richard J. Preston and Victor S. Peterson, Springfield, Mass., assignors to United Aircraft Corporation, East Hartford, Conn., a corporation of Delaware
Filed Mar. 26, 1962, Ser. No. 182,232
4 Claims. (Cl. 228—7)

This invention relates to a control system for automatically following an irregular pattern, and particularly to a system for automatically controlling the position of a tool which is performing some operation on a workpiece. A novel feature of this invention is the incorporation of an adjustable velocity control which will provide a constant tangential velocity during operation.

There are many applications in which it is desired to automatically control the position of a tool performing some operation on a workpiece; for example, in welding a seam formed by butting together two pieces of material, it is necessary that the welding element follow the seam. Sensors in the form of seam followers are well known in the art, and may be employed to follow the seam. The welding element may be physically attached to the seam follower, but it has been found that the heat and electromagnetic disturbances produced by the welding element may adversely affect the operation of the sensors. It is therefore preferable to position the welding element away from the sensors and utilize an automatic tracking system to control the welding element position. Greater position accuracy may also be obtained in this way. The welding element may be any well known type of welder, including electron beam machines.

This invention utilizes a novel tracking system for following the seam to be welded and positioning the welding element to weld the seam. The system first records and then tracks an exact dulpicate of the seam configuration to be welded. A roll of tape is driven in synchronism with the workpiece to be welded. A continuous strip chart recording is made of the pattern of the seam, and this chart is used to control the position of the remote welding element. This technique allows the welding element to be positioned at any desired distance from the seam follower, and further permits the chart to be used as a permanent record of the pattern if desired. A permanent chart may be produced by a pen trace, the pen following the excursions of the seam in response to a servo drive, or a magnetic recording technique may be used in which the magnetic recording head is driven by the servo system. A trace position readout transducer is located at a distance behind the seam position recording mechanism, and the readout transducer follows the trace. The welding element is positioned via a servo system to the readout transducer. Since the trace is an exact scaled duplicate of the seam, the welding element will be positioned over the seam. If an electron beam machine is used as the welder, the deflection coils of the electron beam machine may be actuated to position the beam on the seam rather than physically positioning the machine itself.

To provide a constant tangential welding velocity, the speed of the drive system for the workpiece and strip chart must be controlled. A novel system has been incorporated which computes the appropriate drive velocity as a function of lateral velocity of the readout transducer. The welding velocity is manually selectable over a broad range, and the maximum lateral velocity of the welder servo positioning system may be fixed by a manual velocity control.

It is therefore an object of this invention to provide a novel control system for following an irregular pattern.

Another object of this invention is a novel control system for positioning a tool to follow an irregular pattern.

A further object of this invention is a novel control system for automatically positioning a welding element over a seam, the welding element being located at a distance from a sensor which tracks the seam.

Another object of this invention is a novel control system for positioning a tool to follow an irregular pattern in which a permanent record is made of the pattern.

A further object of this invention is to provide a novel welding system for irregular patterns in which a constant tangential velocity weld is produced.

Another object of this invention is to provide a delayed memory system for directing a tool to follow an irregular pattern.

A further object of this invention is to provide a novel delay welding head positioning system in which an electron beam machine may be used to perform the welding.

These and other objects and a fuller understanding of the invention may be had by referring to the following description and claims taken in conjunction with the accompanying drawings in which:

FIGURE 4 is a block diagram showing the servo system which controls the position of the seam transducer and the seam recorder of FIGURE 1; and FIGURE 5 is a block diagram of the constant tangential velocity control system of FIGURE 1.

Figure 1:
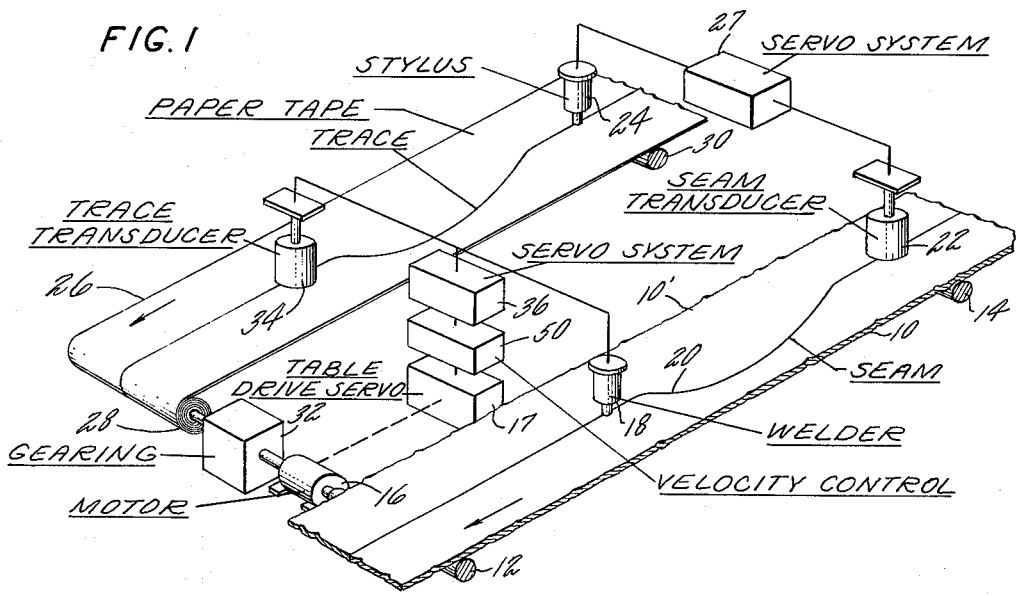
FIGURE 1 is a schematic drawing illustrating the control system of the invention.

Referring to FIGURE 1, the workpiece to be welded is positioned upon rollers 12 and 14. Roller 12 is driven by a rotor 16 to move the workpiece past the welding head 18. Motor 16 may be controlled by a table drive servo system 17. Roller 14 is free and serves merely as a support for the workpiece 10. The workpiece may consist of two pieces of material 10, 10′ butted together to form a seam 20 which has a uniform or non-uniform welding pattern. The seam 20 may also be formed by joining two or more pieces of material at right angles in the form of an obscured T edge, or by a lap joint, or by any contiguous relationship. The workpiece may be relatively flat pieces of material, such as wing panels on aircraft, or may be of irregular cross section, the shape of the workpiece being limited only by the ability of the workpiece drive mechanism to accurately transport the workpiece past the welding head. Any type of transport mechanism may be used which will direct the workpiece past the welding head and allow the welding to be performed.

A transducer 22 is positioned longitudinally in front of the welder 18. The function of the transducer 22 is to follow the seam 22 and to position a writing head, indicated as stylus 24, to trace the seam pattern upon a recording medium such as paper tape 26. The tape is driven at the same speed or in a fixed speed ratio to the workpiece 10 by motor 16. Servo system 27, shown in greater detail in FIGURE 4, will laterally position stylus 24 in response to the movement of seam transducer 22. Roller 28, which is driven by motor 16, will store the traced paper tape. The supply roll of paper tape is not shown. Roller 30 serves as a support for the tape. It may be desired to drive the tape 26 at a different speed from the speed of the workpiece 10, and gearing 32 is shown between motor 16 and roller 28 to accomplish this result.

A trace transducer 34 such as a line follower is located below the stylus 24. Any type of line follower may be used, as for example an optical line follower utilizing a light source and photocells. Such line followers are well known in the art. A typical line follower is manufactured by the F. L. Moseley Co. of Pasadena, California.

The trace transducer follows the trace recorded on tape 26 by stylus 24. A servo system 36 similar to that of block 27 connects trace transducer 34 with welder 18, and welder 18 is thereby laterally positioned over the seam 20, since the trace or tape 26 is an exact replica of the seam 20.

The physical separation between seam transducer 22 and welder 18 is not critical and may be varied to suit the convenience of the operation. However, the transducer 22 should be located far enough away from the welder 18 to reduce harmful temperature and other extraneous effects on the seam transducer 22 due to welding head proximity. In addition, the spacing between welder 18 and seam transducer 22 must be the same as the spacing between trace transducer 34 and stylus 24. The transducer elements 22 and 34, the welder 18, and the stylus 24 are preferably fixed to prevent longitudinal movement, that is, movement along the direction of movement of the workpiece and tape, but these elements must be free to move laterally to follow the random excursions of the seam to be welded. Any well-known mechanical connection may be used to physically position the movable elements. The connections between seam transducer 22 and stylus 24, and the connection between trace transducer 34 and welder 18, may in fact be rigid mechanical connections rather than servo systems 27 and 36. However, since the workpieces may be quite large, it would be preferable to use a servo system to perform the necessary positioning operation.

Figure 2:
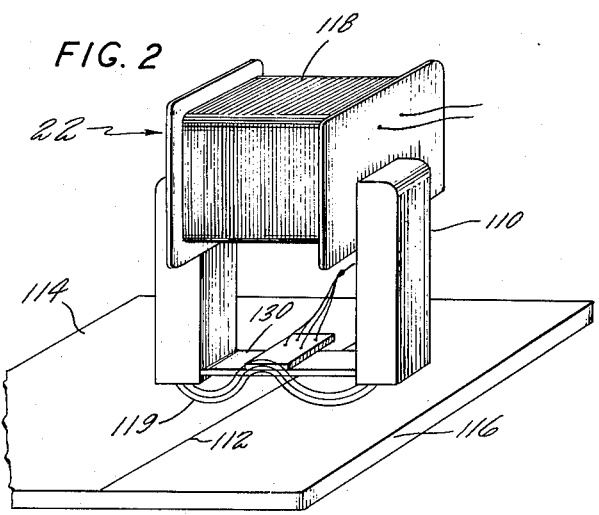
FIGURE 2 shows the seam transducer of FIGURE 1.
Figure 3:
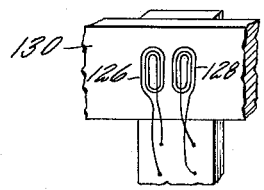
FIGURE 3 is a detailed showing of the seam transducer pickup coils.

The seam transducer 22 is preferably one of the type disclosed and claimed in copending U.S. application Serial No. 86,442 filed February 1, 1961, now Patent No. 3,141,952, entitled "Electronic Seam Follower" and assigned to the same assignee, and the teachings of the referenced application are hereby incorporated into the present application. Briefly, in FIGURE 2, a U-shaped core 110 of magnetic material is positioned over the seam 112 formed by joining metallic materials 114, 116 and a solenoid coil 118 is mounted upon the core 110. The coil 118 is energized with a sinusoidal voltage from an outside source. The frequency of oscillation may be adjusted to obtain maximum effects for different kinds of metallic materials. When core 110 is positioned over the seam, a magnetic flux, represented as 119, is generated through the metallic materials and across the seam 112. Where the seam is present a magnetic flux distortion occurs in the flux pattern 119 and extends above the material on both sides of the seam of a metallic material. Since the peak of the flux disturbance is directly centered over the seam, a non-ambiguous transducer, which may be in the form of two flat spirally wound pickup coils 126 and 128, is positioned to sense the flux distortions. See FIGURE 3. The pickup coils 126 and 128 may be wires attached to a connecting member 130 of insulating material which joins the two legs of core 110. The pickup coils 126 and 128 may be printed on member 130. The transducer coils are normally positioned in the plane of the poles of the core 110 and centered between the core poles. Utilizing the two pickup coils 126 and 128, the flux intensity through each coil is equal only when the coils are centered over the seam or completely away from the seam. A condition where the transducer is slightly off the seam will cause the output of one coil to increase and that of the other to decrease.

FIGURE 4 shows in block diagram form a typical servo system which may be incorporated. The seam transducer 22 is positioned manually over the seam 20 to begin operation. Two outputs will result, one for each coil. Each output is amplified and compared in comparator 40. If the two signals are identical, no error signal will result and the seam follower will be accurately positioned over the seam. If the two signals are not equal, an error signal will be generated, the error signal having an amplitude and polarity indicative of the amount and direction of deviation of the seam follower from the seam.

The error signal is amplified and fed to reversible servo motor 42 which moves the seam follower laterally until the error signal is reduced to zero. A synchro transmitter 44 is connected as by a shaft to motor 42, and actuation of motor 42 will activate the synchro 44 to transmit a signal to synchro receiver 46. The received signal is amplified and fed to the stylus drive motor 48 which positions stylus 24 laterally in response to the movement of seam transducer 22. Thus, the trace produced by stylus 24 is an exact duplicate of the seam.

The stylus 24 has been described as a pen which makes a physical record of the seam upon paper tape 26. However, the stylus may also be a magnetic recording head which records a magnetic track upon tape 26. In this case the tape may be continuous, the magnetic impressions being erased after being sensed by the trace transducer 34. It is obvious that this method will not produce a permanent record of the seam. Other recording techniques may also be used such as a heated stylus recording paper system, but whatever technique is used, the trace transducer 34 must be able to follow the trace produced.

Servo system 36 connecting the trace transducer 34 and welder 18 may be identical to that of FIGURE 4 with the seam transducer 22 being replaced with the trace transducer 34 and the stylus 24 being replaced with the welder 18. As long as the seam 20 to be welded is relatively straight, the system thus far disclosed will be adequate. However, if the seam 20 is irregular, a constant velocity drive motor will produce a relatively heavy weld where the seam is substantially aligned with the direction of movement of the workpiece and a relatively light weld where the seam deviates substantially from a straight line. Thus, it is desirable to regulate the velocity of the workpiece and the tape and vary this velocity as a function of the seam deviation in order to achieve a substantially uniform weld. Block 50 of FIGURE 1 shows a velocity control which will vary the longitudinal speed of the workpiece 10, that is, the velocity in the Y direction, as a function of the velocity of movement of the seam 20 and trace transducer 34 in the lateral or X direction. Velocity control 50 will thus control the speed of motor 12 to vary the longitudinal speed of workpiece 10 to achieve a constant velocity weld.

FIGURE 5 shows in block diagram form a velocity control system for achieving a constant tangential velocity weld. Movement of the welder 18 in the X direction may be sensed by a signal from the servo motor which positions the welder 18 or trace transducer 34. Motor movement may be transmitted by means of a shaft connection from the welder servo positioning motor (not shown) to A.C. tachometer generator 52. The output of tach generator 52 will be a signal indicative of the velocity of the welder 18 in the X direction. The X velocity signal is demodulated at 53 and fed to a diode squaring matrix 54 where the X velocity is converted into a signal proportional to the square of the velocity. The sign of the quantity is disregarded in this computation, since the direction of movement is immaterial as long as the velocity is known. Squaring circuits are well known in the art, and operate on the principles of the diode conduction curve being similar to the curve of a number plotted against the square of the number.

The desired or maximum tangenital velocity, that is, the workpiece velocity necessary to achieve the desired weld when the seam is a straight line, is computed and a circuit 56 labeled tangential velocity generates a signal representative of this quantity. This velocity signal is preferably adjustable by means of a manual set, in order to fit the desired weld to the type and thickness of the material being welded. The maximum velocity from the circuit of block 56, which may be any known type of signal generator, is fed to a squaring matrix 57 and then to a summing amplifier 58 where the X squared signal is subtracted from the squared maximum velocity signal.

The output from summing amplifier 58 is fed to a diode square root matrix 60 where the square root of the amplifier output is extracted. The square root matrix 60 is similar in principle to the squaring matrix 54, that is, one or more diodes are connected in series or parallel to achieve a resultant diode conduction curve equivalent to the curve of the square root of a number plotted against the number itself. The output of square root matrix 60 is fed through amplifier 62 to table drive motor 16 to thereby control the speed of motor 16 and thereby control the velocity of workpiece 10 in the Y direction. A rate feedback loop may be used in the table drive system if desired to provide stability to the system.

The operation of the above velocity control system may be explained in terms of the solution of a right triangle, $X^2+Y^2=Z^2$. For a straight line weld, there will be zero velocity in the X or lateral direction. The velocity sensed by tach generator 52 will therefore be zero, and the output from squaring matrix 54, X squared, will also be zero. The tangential velocity from the circuit of block 56, through squaring matrix 57, which is equivalent to Z squared in the above equation, will be fed to summing amplifier 58, and since the X squared quantity to be subtracted therefrom is zero, the output from summing amplifier 58, Y squared, will be equal to Z squared. When the square root of the Y squared term is taken by square root matrix 60, the result will be that the Y signal to be applied to table drive motor 16 is equal to the signal generated by tangential velocity circuit 56. As long as there is no lateral movement of the seam, that is, as long as the seam is a straight line, the signal applied to motor 16 will be constant, and the workpiece 10 and tape 26 will move at a constant velocity. However, if the seam deviates from a straight line, tach generator 52 will convert such movement in the X direction into an X velocity signal which is squared in matrix 54 and then subtracted from the Z squared term in summing amplifier 58, thus resulting in a different Y squared term. The Y term thus produced will be a lower value than the previous Y term generated when the X velocity was zero, and the new lower Y term will result in table drive motor 16 being driven at a lower speed, thus producing a lower velocity for workpiece 10 and tape 26. It is therefore obvious that the velocity of the workpiece as it is welded will be determined by the tangential velocity at the point of weld, and that a constant velocity weld will be achieved.

It is apparent that the constant tangential velocity system described above is merely representative, and that any other type of system which will control the longitudinal velocity of the workpiece as a function of the lateral deviation of the seam to thereby achieve a relatively constant weld may be used. Sine-cosine potentiometers, resolvers and three-dimensional cams are particularly well suited to perform this function.

It is also obvious that the novel delayed positioning system described need not be limited to welding, but may be used wherever it is desired to position a tool to follow a pattern. For example, the cutting of patterns may easily be performed by the above system. The details of construction and the combination and arrangement of components may be modified to suit the particular application without departing from the scope of the invention.

We claim:

1. Apparatus for automatically positioning a tool over a workpiece having an irregular pattern comprising
    a tool positioned adjacent said workpiece,
    means for moving said workpiece relative to said tool,
    a pattern follower positioned upstream of said tool for tracking said workpiece pattern,
    tape means,
    means for moving said tape means at a speed proportional to the speed of movement of said workpiece relative to said tool,
    tracing means positioned adjacent said tape means for recording upon said tape means,
    means directly connecting said tracing means to said pattern follower whereby a duplicate of said workpiece pattern is recorded upon said tape means,
    a trace follower positioned adjacent said tape means downstream of said tracing means for tracking said duplicate workpiece pattern as said tape is moved, said trace follower being a distance from said tracing means equal to the distance between said pattern follower and said tool, and
    means connecting said trace follower to said tool whereby said tool is continuously positioned over said pattern in response to the tracking of said duplicate pattern by said trace follower.

2. Apparatus as in claim 1 and including means responsive to movements of said tool perpendicular to the relative direction of movement of said workpiece for varying the speed of movement of said workpiece relative to said tool to thereby produce a substantially constant tangential velocity movement of said tool over said pattern.

3. Apparatus for automatically welding an irregular seam formed by joining two workparts comprising
    a welding element positioned adjacent said seam,
    motor means for moving said workparts relative to said welding element,
    a seam follower positioned upstream of said welding element for tracking said seam,
    a tape,
    means for moving said tape at a speed proportional to the speed of movement of said workparts relative to said welding element,
    tracing means positioned adjacent said tape for recording upon said tape,
    a first servo means connecting said tracing means with said seam follower whereby said tracing means is varied in position in response to movement of said seam follower and said tracing means records a duplicate of said seam upon said tape,
    a trace follower positioned adjacent said tape downstream of said tracing means for tracking said duplicate seam pattern as said tape is moved, said trace follower being a distance from said tracing means equal to the distance between said seam follower and said welding element, and
    second servo means connecting said trace follower to said welding element whereby said welding element is continuously positioned over said seam in response to the tracking of said duplicate pattern by said trace follower.

4. Apparatus as in claim 3 and including means for producing a signal proportional to the velocity of said welding element in a direction perpendicular to the relative direction of movement of said workpiece, a reference signal indicative of maximum desired tangential velocity, means for comparing said velocity signal with said reference signal to produce an error signal, and means responsive to said error signal for varying said motor means to thereby produce a substantially constant velocity weld of said workpiece.

References Cited by the Examiner

UNITED STATES PATENTS

| | | | |
|---|---|---|---|
| 2,778,926 | 1/57 | Schneider. | |
| 3,004,166 | 10/61 | Greene | 219—124 |
| 3,017,496 | 1/62 | Greene | 219—124 |
| 3,124,093 | 3/64 | Wakeley | 113—134 |
| 3,150,624 | 9/64 | Brems | 113—124 |

FOREIGN PATENTS 802,206  10/58  Great Britain.

JOHN F. CAMPBELL, *Primary Examiner.*